United States Patent [19]
Fujimoto et al.

[11] Patent Number: 5,683,834
[45] Date of Patent: Nov. 4, 1997

[54] NONAQUEOUS SECONDARY BATTERY

[75] Inventors: Hiroshi Fujimoto; Yasuo Aotsuka, both of Kanagawa, Japan

[73] Assignee: Fuji Photo Film Co., Ltd., Kanagawa, Japan

[21] Appl. No.: 518,452

[22] Filed: Aug. 23, 1995

[30] Foreign Application Priority Data

Sep. 7, 1994 [JP] Japan .................................. 6-213897

[51] Int. Cl.$^6$ .......................... H01M 10/38; H01M 10/40
[52] U.S. Cl. .............................. 429/218; 429/94; 429/225
[58] Field of Search .......................... 429/94, 218, 225; 29/623.1, 623.3, 623.5

[56] References Cited

U.S. PATENT DOCUMENTS

| | | | |
|---|---|---|---|
| 4,668,595 | 5/1987 | Yoshino et al. | 429/194 |
| 5,273,848 | 12/1993 | Noguchi et al. | 429/218 |
| 5,286,582 | 2/1994 | Tahara et al. | 429/218 |
| 5,395,711 | 3/1995 | Tahara et al. | 429/197 |
| 5,401,599 | 3/1995 | Tahara et al. | 429/218 |
| 5,514,496 | 5/1996 | Mishima et al. | 429/218 |

FOREIGN PATENT DOCUMENTS

| | | | |
|---|---|---|---|
| A0582173 | 2/1994 | European Pat. Off. | |
| 4-12471 | 1/1992 | Japan | H01M 10/40 |
| A 4-012471 | 1/1992 | Japan . | |
| 4-34855 | 2/1992 | Japan | H01M 4/62 |
| 6-132032 | 5/1994 | Japan | H01M 4/58 |

OTHER PUBLICATIONS

Patent Abstracts of Japan, Abstract of JP-A-61 077 255 Apr. 19, 1986.
Patent Abstracts of Japan, Abstract of JP-A-2 056 871 Feb. 26, 1990.
Patent Abstracts of Japan, Abstract of JP-A-59 180 974 Oct. 15, 1984.
Patent Abstracts of Japan, Abstract of JP-A-59 194 363 Mar. 18, 1983.
Patent Abstracts of Japan, Abstract of JP-A-3 291 862 Dec. 24, 1991.
Harada, "Patent Abstract of Japan", vol. 16, No. 162 abstract of JP-A-4-012471, Apr. 20, 1992.
Fumiko, "Patent Abstracts of Japan", vol. 9, No. 39, abstract of JP-A-59-180974, Feb. 19, 1985.

*Primary Examiner*—Prince Willis, Jr.
*Assistant Examiner*—Carol Chaney
*Attorney, Agent, or Firm*—Sughrue, Mion, Zinn, Macpeak & Seas, PLLC

[57] ABSTRACT

A nonaqueous secondary battery comprising positive and negative sheet electrodes, each composed of a collector coated with an electrode material mixture containing the respective active material and a nonaqueous electrolyte containing a lithium salt, wherein the electrode material mixture is present on both the inner and the outer sides of the collector and the coating thickness of the electrode material mixture on the inner side of the collector of the positive and/or negative electrode(s) is smaller than that of the electrode material mixture on the outer side of said collector. The battery is excellent in charge and discharge cycle characteristics, and the sheet electrodes have excellent winding properties when rolled up into cylinders.

11 Claims, 1 Drawing Sheet

NONAQUEOUS SECONDARY BATTERY

FIELD OF THE INVENTION

This invention relates to a cylindrical nonaqueous secondary battery which is prepared by spirally rolling a laminate of sheet-shaped electrodes and a belt-shaped separator into cylinder and putting the spirally rolled battery into a battery case.

BACKGROUND OF THE INVENTION

Aqueous batteries, such as lead batteries and nickel-cadmium batteries, have hitherto prevailed as secondary batteries for general use. While excellent in charge and discharge cycle characteristics, these aqueous batteries are unsatisfactory in terms of energy density. Nonaqueous secondary batteries using lithium or a lithium alloy or a carbonaceous material as a negative electrode active material have recently been developed in place of the aqueous secondary batteries.

Batteries using lithium active materials are advantageous for their high energy density, reduced self discharge, and lightness. The problem associated with lithium active materials is that metallic lithium grows dendritically during charge and discharge to cause an internal short circuit, involving a danger of ignition because of high activity of the dendritical metal per se. To solve the problem, a calcined carbonaceous material capable of intercalating and deintercalating lithium has recently been put to practical use. However, the frequency of charge and discharge of secondary batteries is markedly increasing in use as a mobile power source in the recent electronic equipment that has been reducing the size and weight, and further improvement in cycle life has been demanded. In particular, secondary batteries suffer deterioration of cycle characteristics more easily, when used in electronic equipment requiring a high current for charge and discharge, as compared with when used in general use under a low current condition.

To improve cycle characteristics, it has been proposed to use a carbonaceous material having a specific graphite-like crystal structure parameter value as a negative electrode as disclosed in JP-A-6-132032 (the term "JP-A" as used herein means an "unexamined published Japanese patent application") and to specify the length of the adhesive tape for fixing the end of the roll as disclosed in JP-A-6-150971. However, these techniques are still unsatisfactory for use in electronic equipment requiring a high current for charge and discharge.

In the case of cylindrical batteries in which sheet-shaped electrodes are rolled into cylinder, the strain of the roll must be minimized for smooth insertion of the roll into a battery case. Otherwise, the roll might be angular and could not be fitted into the case, or the sheet-shaped electrodes in the central part of the roll might be bent or the active material might fall off the collector at that part due to the small curvature. These troubles tend to occur particularly when the coating thickness of the electrode is increased to increase the capacity. In the light of these circumstances, improvement in winding properties is also demanded.

In order to improve winding properties, it has been proposed to use a core or to previously shape the beginning of a roll to the desired curvature by means of a tool. However, these means are insufficient for obtaining satisfactory winding properties when the sheet-shaped electrode has a large coating thickness.

Although a nonaqueous battery which is rolled into cylinder is described in JP-A-4-34855, the nonaqueous battery that the coating thickness of the electrode material mixture on the inner and outer sides of the collector is the same, is described in JP-A-4-34855.

Further, it is described in JP-A-4-12471 that an amount of an active material in the most outer side of the sheet-shaped electrodes rolled is larger than that of the most inner side of the sheet-shaped electrodes rolled for improving a cycle characteristics

SUMMARY OF THE INVENTION

An object of the present invention is to provide a cylindrical nonaqueous secondary battery having excellent charge and discharge cycle characteristics, particularly suitability to high current charge and discharge.

Another object of the present invention is to provide a cylindrical nonaqueous secondary battery in which sheet-shaped electrodes exhibit excellent winding properties when they are rolled up.

The above objects of the present invention are accomplished by a nonaqueous secondary battery comprising positive and negative sheet electrodes, each composed of a collector coated with an electrode material mixture containing the respective active material and a nonaqueous electrolyte containing a lithium salt, wherein the electrode material mixture is present on both the inner and the outer sides of the collector and the coating thickness of the electrode material mixture on the inner side of the collector of the positive and/or negative electrode(s) is smaller than that of the electrode material mixture on the outer side of the collector.

DETAILED DESCRIPTION OF THE INVENTION

Figure 1:
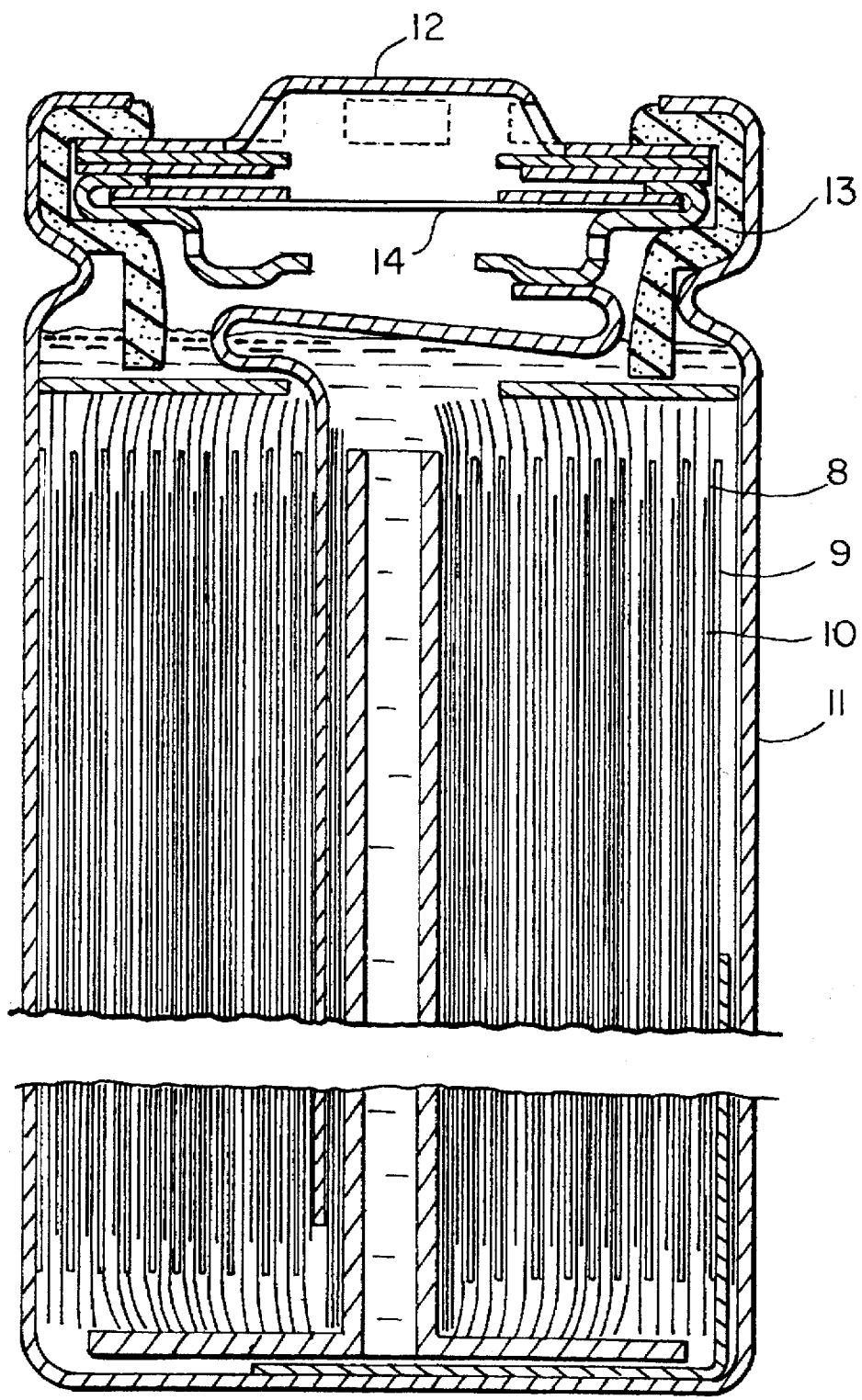
FIG. 1 is a cross section of a cylindrical battery prepared in Examples.

It is preferable that the coating thickness of the electrode material mixture on the inner side of a collector is from 60 to 97%, more preferably from 70 to 95%, most preferably from 75 to 96%, of that of the electrode material mixture on the outer side of the collector.

The effects of the present invention are produced if only the coating thickness of the electrode material mixture on the inner side of a collector is smaller than that on the outer side of the collector. If the coating thickness on the inner side is more than 97% of that on the outer side, the electrode material mixture on the inner side tends to be wrinkled upon being rolled. If the coating thickness on the inner side is not smaller than that on the outer side, the electrode is bent on being rolled, or the resulting roll becomes angular.

If the coating thickness of the electrode material mixture on the inner side of a collector is less than 60% of that on the outer side, the sheet-shaped electrode is curled when the electrode material mixture is pressed onto the collector, which leads to not only deterioration of production suitability but reduction in cycle characteristics.

The effects of the present invention are particularly noticeable when the total coating thickness of the electrode material mixture on both the inner and the outer sides of a positive electrode (exclusive of the collector) (hereinafter simply referred to as a coating thickness of a positive electrode) and the electrode material mixture on both the inner and the outer sides of a negative electrode (exclusive of the collector) (hereinafter simply referred to as a coating thickness of a negative electrode) ranges from 330 to 600 μm, particularly from 350 to 500 μm.

It is particularly preferable that the coating thickness on the inner side of a collector should be smaller than that on the outer side of the collector in either electrode having a larger coating thickness than the other.

The coating thickness on the inner side of a collector in both positive and negative electrodes may be smaller than that on the outer side. In this case, it is preferable that the total coating thickness on the inner side of both the positive and negative electrodes is 60 to 97%, more preferably 70 to 95%, of the total coating thickness on the outer side of both the positive and negative electrodes.

The effects of the present invention are particularly conspicuous when the battery is charged and discharged at a high current. A charging and discharging current is generally not lower than 500 mA, preferably 500 mA to 6 A, more preferably 1 A to 5 A, most preferably 1.3 A to 5 A.

Where the negative electrode active material of the battery contains a compound mainly comprising an amorphous chalcogen compound and/or an amorphous oxide compound containing at least two elements capable of intercalating and deintercalating lithium and selected from the group consisting of the groups IIIA, IVA and VA of the periodic table, it is preferable that the positive electrode has a thinner electrode material mixture on the inner side of the collector than that on the outer side.

In particular, where the negative electrode active material contains a compound represented by formula (I) shown below, the efficiency of lithium intercalation and deintercalation per unit active material is relatively high so that the coating thickness of the negative electrode can be made smaller than that of the positive electrode.

$$M^1M^2_pM^4_q \quad (I)$$

wherein $M^1$ and $M^2$, which are different from each other, each represents at least one element selected from the group consisting of Si, Ge, Sn, Pb, P, B, Al, As, and Sb; $M^4$ represents at least one element selected from the group consisting of O, S, Se, and Te; p represents a number of from 0.001 to 10; and q represents a number of from 1.00 to 50.

Accordingly, the effects of the present invention are exhibited more remarkably where the coating thickness of an electrode material mixture on the inner side of a collector is smaller than that on the outer side in at least a positive electrode.

The elements of the groups IIIA to VA of the periodic table include B, Al, Ga, In, Tl, Si, Ge, Sn, Pb, P, As, Sb, and Bi, preferably B, Al, Ga, In, Tl, Si, Ge, Sn, Pb, P, Sb, and Bi, more preferably B, Al, Si, Ge, Sn, and P.

Specific examples of the negative electrode active material which can be used in the present invention include GeO, $GeO_2$, SnO, $SnO_2$, PbO, $PbO_2$, $Pb_2O_3$, $Pb_3O_4$, $Sb_2O_3$, $Sb_2O_4$, $Sb_2O_5$, $Bi_2O_3$, $Bi_2O_4$, and $Bi_2O_6$, and non-stoichiometric compounds of these oxides.

Preferred of them are SnO, $SnO_2$, GeO, and $GeO_2$, with SnO and $SnO_2$ being particularly preferred. α-PbO-structure SnO, rutile-structure $SnO_2$, GeO, and rutile-structure $GeO_2$ are preferred, with α-PbO-structure SnO and rutile-structure $SnO_2$ being particularly preferred.

More preferred negative electrode active materials are represented by formula (I):

$$M^1M^2_pM^4_q \quad (I)$$

wherein $M^1$ and $M^2$, which are different from each other, each represents at least one of Si, Ge, Sn, Pb, P, B, Al, As, and Sb, preferably at least one of Si, Ge, Sn, Pb, P, B, Al, and Sb, more preferably at least one of Si, Ge, Sn, Pb, P, B, and Al; $M^4$ represents at least one of O, S, Se, and Te, preferably at least one of O and S, more preferably O; p represents a number exceeding 0 and not exceeding 10, preferably from 0.001 to 10, more preferably from 0.01 to 5, most preferably from 0.01 to 2; and q represents a number of from 1 to 50, preferably 1 to 26, more preferably 1.02 to 6.

The valency of $M^1$ or $M^2$ in formula (I) is not particularly limited and may be either a single valency or a mixed valency. The $M^2$ to $M^1$ ratio may vary continuously within a range of from more than 0 to 10 molar equivalents. The amount of $M^4$, represented by q in formula (I), continuously varies accordingly.

Of the compounds represented by formula (I), preferred are those in which $M^1$ is Sn, i.e., compounds represented by formula (II):

$$SnM^3_pM^5_q \quad (II)$$

wherein $M^3$ represents at least one of Si, Ge, Pb, P, B, Al, As, and Sb, preferably at least one of Si, Ge, Pb, P, B, Al, and Sb, more preferably at least one of Si, Ge, Pb, P, B, and Al; $M^5$ represents at least one of O and S, preferably O; p represents a number exceeding 0 and not exceeding 10, preferably a number of from 0.01 to 5, more preferably from 0.01 to 1.5, most preferably from 0.7 to 1.5; and q represents a number of from 1.0 to 50, preferably from 1.0 to 26, more preferably from 1.02 to 6.

More preferred of the compounds represented by formula (II) are those represented by formula (III):

$$SnM^3_rO_s \quad (III)$$

wherein $M^3$ has the same meaning as defined above, preferably Si; r represents a number exceeding 0 and not exceeding 5.0, preferably a number of from 0.01 to 1.5, more preferably from 0.7 to 1.5; and s represents a number of from 1.0 to 26, preferably from 1.02 to 6.

Examples of the compounds (i.e., composite oxides comprising mainly oxides) represented by formula (II) or (III) include $SnSi_{0.01}O_{1.02}$, $SnGe_{0.01}O_{1.02}$, $SnPb_{0.01}O_{1.02}$, $SnP_{0.01}O_{1.025}$, $SnB_{0.01}O_{1.015}$, $SnAl_{0.01}O_{1.015}$, $SnSi_{0.01}O_{2.02}$, $SnGe_{0.01}O_{2.02}$, $SnPb_{0.01}O_{2.02}$, $SnP_{0.01}O_{2.025}$, $SnB_{0.01}O_{2.015}$, $SnSi_{0.05}O_{1.1}$, $SnGe_{0.05}O_{1.1}$, $SnPb_{0.05}O_{1.1}$, $SnP_{0.05}O_{1.125}$, $SnB_{0.05}O_{1.075}$, $SnSi_{0.05}O_{2.1}$, $SnGe_{0.05}O_{2.1}$, $SnPb_{0.05}O_{2.1}$, $SnP_{0.05}O_{2.125}$, $SnB_{0.05}O_{2.075}$, $SnSi_{0.1}O_{1.2}$, $SnGe_{0.01}O_{1.2}$, $SnPb_{0.1}O_{1.2}$, $SnP_{0.1}O_{1.125}$, $SnB_{0.1}O_{1.15}$, $SnSi_{0.1}O_{2.2}$, $SnGe_{0.1}O_{2.2}$, $SnPb_{0.1}O_{2.2}$, $SnP_{0.1}O_{2.25}$, $SnB_{0.1}O_{2.15}$, $SnSi_{0.2}O_{1.4}$, $SnGe_{0.2}O_{1.4}$, $SnPb_{0.2}O_{1.4}$, $SnP_{0.2}O_{1.5}$, $SnB_{0.2}O_{1.3}$, $SnSi_{0.2}O_{2.4}$, $SnGe_{0.2}O_{2.4}$, $SnPb_{0.2}O_{2.4}$, $SnP_{0.2}O_{2.5}$, $SnB_{0.2}O_{2.3}$, $SnSi_{0.3}O_{1.6}$, $SnGe_{0.3}O_{1.6}$, $SnPb_{0.3}O_{1.6}$, $SnP_{0.3}O_{1.75}$, $SnB_{0.3}O_{1.45}$, $SnSi_{0.3}O_{2.6}$, $SnGe_{0.3}O_{2.6}$, $SnPb_{0.3}O_{2.6}$, $SnP_{0.3}O_{2.75}$, $SnB_{0.3}O_{2.45}$, $SnSi_{0.7}O_{2.4}$, $SnGe_{0.7}O_{2.4}$, $SnPb_{0.7}O_{2.4}$, $SnP_{0.7}O_{2.75}$, $SnB_{0.7}O_{2.05}$, $SnSi_{0.8}O_{2.6}$, $SnGe_{0.8}O_{2.6}$, $SnPb_{0.8}O_{2.6}$, $SnP_{0.8}O_3$, $SnB_{0.8}O_{2.2}$, $SnSiO_3$, $SnGeO_3$, $SnPbO_3$, $SnPO_{3.5}$, $SnBO_{2.5}$, $SnSi_{1.2}O_{3.4}$, $SnGe_{1.2}O_{3.4}$, $SnPb_{1.2}O_{3.4}$, $SnP_{1.2}O_4$, $SnB_{1.2}O_{2.8}$, $SnSi_{1.5}O_4$, $SnGe_{1.5}O_4$, $SnPb_{1.5}O_4$, $SnP_{1.5}O_{4.75}$, $SnB_{1.5}O_{3.25}$, $SnSi_2O_5$, $SnGe_2O_5$, $SnPb_2O_5$, $SnP_2O_6$, $SnB_2O_4$, $SnSi_2O_6$, $SnGe_2O_6$, $SnPb_2O_6$, $SnP_2O_7$, $SnB_2O_5$, $SnSiS_3$, $SnSiSe_3$, $SnSiTe_3$, $SnPS_{3.5}$, $SnPSe_{3.5}$, $SnPTe_{3.5}$, $SnBS_{2.5}$, $SnBSe_{2.5}$, $SnBTe_{2.5}$, $SnP_{0.8}O_3$, $SnB_{0.8}O_{2.2}$, and $SnSi_{0.25}BO_3$.

The valency of Sn and $M^3$ in formula (II) or (III) is not particularly limited and may be a single valency or a mixed valency. The ratio of $M^3$ to Sn in the compound represented by formula (II) may vary continuously within a range of from 0.01 to 10 molar equivalents. Accordingly, the amount of $M^5$, represented by q in formula (II), varies continuously. Similarly, the ratio of $M^3$ to Sn in the compound represented by formula (III) may vary continuously within a range of from 0.01 to 5.0 molar equivalents. Accordingly, the amount of oxygen, represented by s in formula (III), varies continuously.

Of the compounds represented by formula (III), preferred are those represented by formula (IV):

$$SnSi_tP_uM^6_vO_s \qquad (IV)$$

Of the compounds represented by formula (IV), preferred are those represented by formula (V):

$$SnSi_tP_uAl_vO_s \qquad (V)$$

In formulae (IV) and (V), $M^6$ represents at least one of Ge, B, Al, and Pb, preferably at least one of Ge, Al, and B, more preferably Al; t represents a number exceeding 0 and not exceeding 2.0, preferably exceeding 0 and not exceeding 1.5; u represents a number of from 0.01 to 4.0, preferably from 0.01 to 3.5; v represents a number of from 0 to 2.0, preferably from 0 to 1.5; and s represents a number of from 1.0 to 26, preferably from 1.02 to 10.

Specific but non-limiting examples of the oxides represented by formula (IV) or (V) include $SnSi_{0.25}B_{0.2}P_{0.2}O_3$, $SnSi_{0.5}B_{0.2}P_{0.2}O_3$, $SnSi_{0.9}P_{0.1}O_{2.25}$, $SnSi_{0.8}P_{0.2}O_{3.1}$, $SnSi_{0.7}P_{0.3}O_{2.75}$, $SnSi_{0.5}P_{0.5}O_{3.25}$, $SnSi_{0.3}P_{0.7}O_{3.35}$, $SnSi_{0.2}P_{0.8}O_{3.4}$, $SnSi_{0.5}P_{0.1}O_{2.25}$, $SnSi_{0.1}Ge_{0.1}P_{0.9}P_{3.65}$, $SnSi_{0.2}Ge_{0.1}P_{0.7}O_{3.35}$, $SnSi_{0.6}Ge_{0.4}P_{0.1}O_{3.25}$, $SnSi_{0.6}Ge_{0.2}P_{0.2}P_{3.1}$, $SnSi_{0.7}Ge_{0.1}P_{0.2}O_{3.1}$, $SnSi_{0.8}Ge_{0.1}P_{0.1}O_{3.05}$, $SnSi_{0.8}Ge_{0.1}P_{0.3}P_{3.55}$, $SnSiGe_{0.1}P_{0.1}P_{3.45}$, $SnSiGe_{0.2}P_{0.2}P_{3.9}$, $SnSiGe_{0.1}P_{0.2}P_{3.7}$, $SnSi_{0.1}Al_{0.1}P_{0.9}O_{3.6}$, $SnSi_{0.3}Al_{0.1}P_{0.7}O_{3.5}$, $SnSi_{0.6}Al_{0.3}P_{0.1}O_{2.9}$, $SnSi_{0.6}Al_{0.2}P_{0.2}O_3$, $SnSi_{0.6}Al_{0.1}P_{0.3}O_{3.1}$, $SnSi_{0.6}Al_{0.1}P_{0.1}O_3$, $SnSi_{0.8}Al_{0.1}P_{0.2}O_{3.25}$, $SnSi_{0.8}Al_{0.2}P_{0.2}O_{3.4}$, $SnSi_{0.7}Al_{0.2}P_{0.3}O_{3.45}$, $SnSi_{0.4}Al_{0.2}P_{0.6}O_{3.6}$, $SnSiAl_{0.2}P_{0.4}O_{3.5}$, $SnSiAl_{0.1}P_{0.1}O_{3.4}$, $SnSiAl_{0.2}P_{0.2}O_{3.8}$, $SnSiAl_{0.1}P_{0.2}O_{3.65}$, $SnSi_{0.1}B_{0.1}P_{0.9}O_{3.6}$, $SnSi_{0.3}B_{0.1}P_{0.7}O_{3.5}$, $SnSi_{0.6}B_{0.3}P_{0.1}O_{2.9}$, $SnSi_{0.6}B_{0.2}P_{0.2}O_3$, $SnSi_{0.6}B_{0.1}P_{0.3}O_{3.1}$, $SnSi_{0.8}B_{0.1}P_{0.1}O_3$, $SnSi_{0.8}B_{0.1}P_{0.3}O_{3.5}$, $SnSi_{0.1}P_{0.1}O_{3.4}$, $SnSiB_{0.2}P_{0.2}O_{3.8}$, $SnSiB_{0.1}P_{0.2}O_{3.65}$, $SnSi_{0.1}Pb_{0.1}P_{0.9}O_{3.6}$, $SnSi_{0.3}Pb_{0.1}P_{0.7}O_{3.5}$, $SnSi_{0.6}Pb_{0.3}P_{0.1}O_{2.9}$, $SnSi_{0.6}Pb_{0.2}P_{0.2}O_3$, $SnSi_{0.6}Pb_{0.1}P_{0.3}O_{3.1}$, $SnSi_{0.8}Pb_{0.1}P_{0.1}O_3$, $SnSi_{0.8}Pb_{0.1}P_{0.3}O_{3.5}$, $SnSiPb_{0.1}P_{0.1}O_{3.4}$, $SnSiPb_{0.2}P_{0.2}O_{3.8}$, $SnSiPb_{0.1}P_{0.2}O_{3.65}$, $SnPAl_{0.1}O_{3.65}$, $SnPAl_{0.3}O_{3.95}$, $SnP_{0.8}Al_{0.1}O_{3.15}$, $SnP_{0.8}Al_{0.3}O_{2.45}$, $SnP_{0.5}Al_{0.1}O_{2.4}$, and $SnP_{0.5}Al_{0.3}O_{2.7}$. The valency of Sn and $M^6$ are not particularly limited and may be a single valency or a mixed valency. The ratio of $M^6$ to Sn may vary continuously within a range of from 0 to 2 molar equivalents, and the amount of oxygen continuously varies accordingly.

Additional examples of the compounds represented by formulae (I) to (V) are shown below.

$SnSi_{0.1}Ge_{0.1}Pb_{0.1}O_{2.6}$, $SnSi_{0.2}Ge_{0.1}O_{2.6}$, $SnSi_{0.2}Pb_{0.1}O_{2.6}$, $SnGe_{0.2}Si_{0.1}O_{2.6}$, $SnPb_{0.2}Si_{0.1}O_{2.6}$, $SnGe_{0.2}Pb_{0.1}O_{2.6}$, $SnPb_{0.2}Ge_{0.1}O_{2.6}$, $SnSi_{0.9}Ge_{0.1}O_3$, $SnSi_{0.8}Ge_{0.2}O_3$, $SnSi_{0.5}Ge_{0.5}O_3$, $SnSi_{0.9}Pb_{0.1}O_3$, $SnSi_{0.8}Pb_{0.2}O_3$, $SnSi_{0.5}Pb_{0.5}O_3$, $SnGe_{0.9}Si_{0.1}O_3$, $SnGe_{0.8}Si_{0.2}O_3$, $SnPb_{0.9}Si_{0.1}O_3$, $SnPb_{0.8}Si_{0.2}O_3$, $SnSi_{0.8}Ge_{0.1}Pb_{0.1}O_3$, $SnP_{0.9}Ge_{0.1}O_{3.45}$, $SnP_{0.8}Ge_{0.2}O_{3.4}$, $SnP_{0.5}Ge_{0.5}O_{3.25}$, $SnP_{0.9}Pb_{0.1}O_{3.45}$, $SnP_{0.8}Pb_{0.2}O_{3.4}$, $SnP_{0.5}Pb_{0.5}O_{3.25}$, $SnGe_{0.9}P_{0.1}O_{3.05}$, $SnGe_{0.8}P_{0.2}O_{3.1}$, $SnPb_{0.9}P_{0.1}O_{3.05}$, $SnPb_{0.8}P_{0.2}O_{3.1}$, $SnP_{0.8}Ge_{0.1}Pb_{0.1}O_{3.4}$, $SnB_{0.9}Ge_{0.1}O_{2.55}$, $SnB_{0.8}Ge_{0.2}O_{2.6}$, $SnB_{0.5}Ge_{0.5}O_{2.75}$, $SnB_{0.9}Pb_{0.1}O_{2.55}$, $SnB_{0.8}Pb_{0.2}O_{2.6}$, $SnB_{0.5}Pb_{0.5}O_{2.75}$, $SnGe_{0.9}B_{0.1}O_{2.95}$, $SnGe_{0.8}B_{0.2}O_{2.9}$, $SnPb_{0.9}B_{0.1}O_{2.95}$, $SnPb_{0.8}B_{0.2}O_{2.9}$, $SnB_{0.8}Ge_{0.1}Pb_{0.1}O_{2.6}$, $SnSi_{0.25}B_{0.2}P_{0.2}O_3$, $SnSi_{0.5}B_{0.2}R_{0.2}O_3$, $SnSi_{0.9}Al_{0.1}O_{2.95}$, $SnSi_{0.5}Al_{0.5}O_{2.75}$, $SnSi_{0.5}Al_{0.1}O_{2.15}$, $SnSi_{0.5}Al_{0.5}O_{2.75}$, $SnSi_{0.7}Al_{0.3}O_{2.85}$, $SnSiAl_{0.2}O_{3.3}$, $SnSi_{0.5}B_{0.05}O_{2.75}$, $SnSi_{0.5}B_{0.1}O_{2.15}$, $SnSi_{0.5}B_{0.5}O_{2.75}$, $SnSi_{0.7}B_{0.3}O_{2.45}$, $SnSi_{0.9}B_{0.1}O_{2.95}$, $SnSiB_{0.2}O_{3.3}$, $SnSi_{0.5}Pb_{0.05}O_{2.75}$, $SnSi_{0.5}Pb_{0.1}O_{2.15}$, $SnSi_{0.5}Pb_{0.5}O_{2.75}$, $SnSi_{0.7}Pb_{0.3}O_{2.45}$, $SnSi_{0.9}Pb_{0.1}O_{2.95}$, $SnSiPb_{0.2}O_{3.3}$, $SnSi_{0.1}Ge_{0.1}P_{0.9}O_{3.65}$, $SnSi_{0.2}Ge_{0.1}P_{0.7}O_{3.35}$, $SnSi_{0.6}Ge_{0.4}P_{0.1}O_{3.25}$, $SnSi_{0.6}Ge_{0.2}P_{0.2}O_{3.1}$, $SnSi_{0.7}Ge_{0.1}P_{0.2}O_{3.1}$, $SnSi_{0.8}Ge_{0.1}P_{0.1}O_{3.05}$, $SnSi_{0.8}Ge_{0.1}P_{0.3}O_{3.55}$, $SnSiGe_{0.1}P_{0.1}O_{3.45}$, $SnSiGe_{0.2}P_{0.2}O_{3.9}$, $SnSiGe_{0.1}P_{0.2}O_{3.7}$, $SnSi_{0.8}Ge_{0.1}Al_{0.1}O_{2.95}$, $SnSi_{0.8}Ge_{0.1}B_{0.1}O_{2.95}$, $SnSi_{0.8}Ge_{0.1}Sb_{0.1}O_{2.95}$, $SnSi_{0.8}Ge_{0.1}In_{0.1}O_{2.95}$, $SnSi_{0.8}Ge_{0.1}Pb_{0.1}O_{2.95}$, $SnSi_{0.8}B_{0.1}Al_{0.1}O_{2.9}$, $SnSi_{0.8}Sb_{0.1}AlO_{2.9}$, $SnPAl_{0.1}O_{3.65}$, $SnPAl_{0.3}O_{3.95}$, $SnP_{0.8}Al_{0.1}O_{3.15}$, $SnP_{0.8}Al_{0.3}O_{2.45}$, $SnP_{0.5}Al_{0.1}O_{2.4}$, $SnP_{0.5}Al_{0.3}O_{2.7}$, $PbSi_{0.1}O_{1.02}$, $PbGe_{0.01}O_{1.02}$, $PbSi_{0.01}O_{2.02}$, $PbGe_{0.01}O_{2.02}$, $PbP_{0.01}O_{1.025}$, $PbB_{0.01}O_{1.015}$, $PbP_{0.01}O_{2.025}$, $PbGe_{0.01}O_{2.015}$, $PbSi_{0.05}O_{1.1}$, $PbGe_{0.05}O_{1.1}$, $PbSi_{0.05}O_{2.1}$, $PbGe_{0.05}O_{2.1}$, $PbP_{0.05}O_{1.125}$, $PbB_{0.05}O_{1.075}$, $PbP_{0.05}O_{2.125}$, $PbB_{0.05}O_{2.075}$, $PbSi_{0.01}O_{2.2}$, $PbGe_{0.1}O_{2.2}$, $PbSi_{0.1}O_{1.2}$, $PbGe_{0.01}O_{1.2}$, $PbP_{0.1}O_{2.25}$, $PbB_{0.1}O_{2.15}$, $PbP_{0.1}O_{1.25}$, $PbB_{0.1}O_{1.15}$, $PbSi_{0.2}O_{2.4}$, $PbGe_{0.2}O_{2.4}$, $PbSi_{0.2}O_{1.4}$, $PbGe_{0.2}O_{1.4}$, $PbP_{0.2}O_{2.5}$, $PbB_{0.2}O_{2.3}$, $PbP_{0.2}O_{1.5}$, $PbB_{0.2}O_{1.3}$, $PbSi_{0.3}O_{2.6}$, $PbGe_{0.03}O_{2.6}$, $PbSi_{0.3}O_{1.6}$, $PbGe_{0.3}O_{1.6}$, $PbP_{0.3}O_{2.75}$, $PbB_{0.3}O_{2.45}$, $PbP_{0.3}O_{1.75}$, $PbB_{0.3}O_{1.45}$, $PbSi_{0.2}Ge_{0.1}O_{2.6}$, $PbGe_{0.02}Si_{0.1}O_{2.6}$, $PbP_{0.2}Ge_{0.1}O_{2.7}$, $PbGe_{0.2}P_{0.1}O_{2.65}$, $PbP_{0.2}Ge_{0.1}O_{2.5}$, $PbGe0.2B_{0.1}O_{2.55}$, $PbSi_{0.7}O_{2.4}$, $PbGe_{0.7}O_{2.4}$, $PbP_{0.7}O_{2.75}$, $PbB_{0.7}O_{2.05}$, $PbSi_{0.8}O_{2.6}$, $PbGe_{0.8}O_{2.6}$, $PbP_{0.8}O_3$, $PbB_{0.8}O_{2.2}$, $PbSiO_3$, $PbGeO_3$, $PbPO_{3.5}$, $PbBO_{2.5}$, $PbSi_{0.9}Ge_{0.1}O_3$, $PbSi_{0.8}Ge_{0.2}O_3$, $PbSi_{0.5}Ge_{0.5}O_3$, $PbP_{0.9}Ge_{0.1}O_{3.45}$, $PbP_{0.8}Ge_{0.2}O_{3.4}$, $PbP_{0.5}Ge_{0.5}O_{3.25}$, $PbB_{0.9}Ge_{0.1}O_{2.65}$, $PbP_{0.8}Ge_{0.2}O_{2.6}$, $PbP_{0.5}Ge_{0.5}O_{2.75}$, $PbGe_{0.9}Si_{0.1}O_3$, $PbGe_{0.8}Si_{0.2}O_3$, $PbGe_{0.9}P_{0.1}O_{3.05}$, $PbGe_{0.8}P_{0.2}O_{3.1}$, $PbGe_{0.9}B_{0.1}O_{2.95}$, $PbGe0.8B_{0.2}O_{2.9}$, $PbSi_{1.5}O_4$, $PbGe_{1.5}O_4$, $PbP_{1.5}O_{4.75}$, $PbB_{1.5}O_{3.25}$, $PbGe_2O_5$, $PbSi_2O_6$, $PbGe_2O_6$, $PbP_2O_7$, $PbB_2O_5$, $GeSi_{0.01}O_{1.02}$, $GeSi_{0.01}O_{2.02}$, $GeSi_{0.05}O_{1.1}$, $GeSi_{0.05}O_2$, $GeSi_{0.1}O_{1.2}$, $GeSi_{0.1}O_{2.2}$, $GeSi_{0.2}O_{1.4}$, $GeSi_{0.2}O_{2.4}$, $GeSi_{0.3}O_{1.6}$, $GeSi_{0.3}O_{2.6}$, $GeSi_{0.05}O_2$, $GeSi_{0.5}O_3$, $GeSi_{0.7}O_{2.4}$, $GeSi_{0.7}O_{3.4}$, $GeSiO_3$, $GeSiO_4$, $GeSi_{1.5}O_4$, $GeSi_{1.5}O_5$, $GeP_{0.01}O_{1.025}$, $GeP_{0.01}O_{2.025}$, $GeP_{0.05}O_{1.125}$, $GeP_{0.05}O_{2.125}$, $GeP_{0.01}O_{1.25}$, $GeP_{0.1}O_{2.25}$, $GeP_{0.2}O_{1.5}$, $GeP_{0.2}O_{2.5}$, $GeP_{0.3}O_{1.75}$, $GeP_{0.3}O_{2.75}$, $GeP_{0.5}O_{2.25}$, $GeP_{0.5}O_{3.25}$, $GeP_{0.7}O_{2.75}$, $GeP_{0.7}O_{3.75}$, $GePO_{3.5}$, $GePO_{4.5}$, $GeP_{1.5}O_{4.75}$, $GeP_{1.5}O_{5.75}$, $GeB_{0.01}O_{1.015}$, $GeB_{0.01}O_{2.015}$, $GeB_{0.05}O_{1.075}$, $GeB_{0.05}O_{2.075}$, $GeB_{0.1}O_{1.15}$, $GeB_{0.1}O_{2.15}$, $GeB_{0.2}O_{1.3}$, $GeB_{0.2}O_{2.3}$, $GeB_{0.3}O_{1.45}$, $GeB_{0.3}O_{2.45}$, $GeB_{0.5}O_{1.75}$, $GeB_{0.5}O_{2.75}$, $GeB_{0.7}O_{2.05}$, $GeB_{0.7}O_{3.05}$, $GeBO_{2.5}$, $GeBO_{3.5}$, $GeB_{1.5}O_{3.25}$, $GeB_{1.5}O_{4.25}$,

In the present invention, the excellent charge and discharge cycle characteristics as well as high discharging voltage, high capacity, and high safety can be ensured by using at least one of the compounds represented by formulae (I) to (V) as a main negative electrode active material. Pronouncedly excellent effects of the present invention can be obtained by using a compound containing Sn in which Sn is present with divalency as a negative electrode active material. The valency of Sn can be determined through chemical titration, for example, according to the method described in *Physics and Chemistry of Glasses*, Vol. 8, No. 4, p. 165 (1967). It is also decided from the Knight Shift in the solid nuclear magnetic resonance (NMR) of Sn. For example, in broad-line NMR measurement, metallic Sn (zero valent Sn) shows a peak in an extremely low magnetic field in the vicinity of 7000 ppm with reference to $Sn(CH_3)_4$, whereas the peak of SnO (divalent Sn) appears around 100 ppm, and that of $SnO_2$ (tetravalent Sn) appears around −600 ppm. Like this, the Knight Shift largely depends on the valency of Sn, the center metal, with the ligands being the same. The valency can thus be determined by the peak position obtained by $^{119}$sn-NMR analysis.

The negative electrode active material of the present invention may contain various compounds, such as compounds of the group Ia elements (e.g., Li, Na, K, Rb, and Cs), compounds of transition metals (e.g., Sc, Ti, V, Cr, Mn, Fe, Co, Ni, Cu, Zn, Y, Zr, Nb, Mo, Tc, Ru, Rh, Pd, Ag, Cd, lanthanides, Hf, Ta, W, Re, Os, Ir, Pt, Au, and Hg), compounds of the group IIa elements (e.g., Be, Mg, Ca, Sr, and Ba), and compounds of the group VIIA elements (e.g., F, Cl, Br, and I). The negative electrode active material may further contain various compounds (e.g., compounds of Sb, In or Nb) having electron conductivity as a dopant. The amount of these compounds to be added is preferably up to 20 mol % based on the total amount of $M^1$ and $M^2$.

The composite oxides mainly comprising the oxide represented by formulae (I) to (V) are synthesized by either a calcination method or a solution method.

The calcination method comprises mixing $M^1$ compound and $M^2$ compound (wherein $M^1$ and $M^2$, which are different from each other, each represents at least one of Si, Ge, Sn, Pb, P, B, Al, As, and Sb) and calcining the mixture.

The examples of the tin compound include SnO, $SnO_2$, $Sn_2O_3$, $Sn_3O_4$, $Sn_7O_{13} \cdot H_2O$, $Sn_8O_{15}$, stannous hydroxide, stannic oxyhydroxide, stannous acid, stannous oxalate, stannous phosphate, orthostannic acid, metastannic acid, parastannic acid, stannous fluoride, stannic fluoride, stannous chloride, stannic chloride, stannous bromide, stannic bromide, stannous iodide, stannic iodide, tin selenide, tin telluride, stannous pyrophosphate, tin phosphate, stannous sulfide, and stannic sulfide.

The examples of the silicon compound include $SiO_2$, SiO; silicon tetrachloride, silicon tetrabromide; halogenated organosilicon compounds, such as trichloromethylsilane, dimethyldichlorosilane, and trimethylchlorosilane; organosilicon compounds, such as tetramethylsilane and tetraethylsilane; alkoxysilane compounds, such as tetramethoxysilane and tetraethoxysilane; and hydrosilane compounds, such as trichlorohydrosilane.

The examples of the germanium compound include $GeO_2$, GeO, germanium tetrachloride, germanium tetrabromide, and germanium alkoxide compounds, such as germanium tetramethoxide and germanium tetraethoxide.

The examples of the lead compound include $PbO_2$, PbO, $Pb_2O_3$, $Pb_3O_4$, $PbCl_2$, lead chlorate, lead perchlorate, lead nitrate, lead carbonate, lead formate, lead acetate, lead tetraacetate, lead tartrate, lead diethoxide, and lead di(isopropoxide).

The examples of the phosphorus compound include phosphorus pentoxide, phosphorus oxychloride, phosphorous pentachloride, phosphorus trichloride, phosphorous tribromide, trimethyl phosphate, triethyl phosphate, tripropyl phosphate, stannous pyrophosphate, and boron phosphate.

The examples of the boron compound include boron sesquioxide, boron trichloride, boron tribromide, boron carbide, boric acid, trimethyl borate, triethyl borate, tripropyl borate, tributyl borate, boron phosphide, and boron phosphate.

The examples of the aluminum compound include aluminum oxide (α-alumina or β-alumina), aluminum silicate, aluminum tri-isopropoxide, aluminum tellurite, aluminum chloride, aluminum borate, aluminum phosphide, aluminum phosphate, aluminum lactate, aluminum borate, aluminum sulfide, aluminum sulfate, and aluminum boride.

The examples of the antimony compound include antimony tribromide, antimony trichloride, diantimony trioxide, and triphenylantimony.

In addition to the above-mentioned amorphous chalcogen compounds and amorphous oxides, carbonaceous materials, such as thermal decomposition carbon, coke (e.g., pitch coke, needle coke, petroleum coke), graphite, glassy carbon, calcined organic high polymers (e.g., calcined phenolic resins or furan resins), carbon fiber, and activated carbon, can also be used as a negative electrode active material.

Calcination is preferably carried out at a rate of temperature rise of 4° to 2000° C./min, more preferably 6° to 2000° C./min, most preferably 10° to 2000° C./min; at a calcination temperature of 250° to 1500° C., more preferably 350° to 1500° C., most preferably 500° to 1500° C.; for a period of 0.01 to 100 hours, more preferably 0.5 to 70 hours, most preferably 1 to 20 hours. After calcination, the system is cooled at a rate of temperature drop preferably of 2° to $10^7$° C./min, more preferably 4° to $10^7$° C./min, still more preferably 6° to $10^7$° C./min, most preferably 10° to $10^7$° C./min.

The term "rate of temperature rise" as used herein means an average rate of temperature rise of from 50% calcination temperature (°C.) to 80% calcination temperature (°C.), and the term "rate of temperature drop" as used herein means an average rate of temperature drop of from 80% calcination temperature (°C.) to 50% calcination temperature (°C.).

Cooling of the calcined product may be conducted either in a calcining furnace or out of the furnace, for example, by throwing the product into water. Ultra rapid cooling methods described in *Ceramics Processing*, p. 217, Gihodo (1987), such as a gun method, a Hammer-Anvil method, a slap method, a gas atomizing method, a plasma spray method, a centrifugal quenching method, and a melt drag method, can also be used. Further, cooling may be conducted by a single roller method or a twin roller method described in *New Glass Handbook*, p. 172, Maruzen (1991). Where the material melts during calcination, the calcined product may be withdrawn continuously while feeding the raw materials. The melt preferably stirred during calcination.

The calcining atmosphere preferably has an oxygen content of not more than 5% by volume. An inert gas atmosphere is more preferred. Examples of inert gas include nitrogen, argon, helium, krypton, and xenon.

The compound represented by formulae (I) to (V) preferably has an average particle size of from 0.1 to 60 μm. The calcined product can be ground to size by means of well-known grinding machines or classifiers, such as a mortar, a ball mill, a sand mill, a vibration ball mill, a satellite ball mill, a planetary ball mill, spinning air flow type jet mill, and a sieve. If necessary, wet grinding using water or an organic solvent, such as methanol, may be conducted. The grinds are preferably classified to obtain a desired particle size either by dry or wet classification by means of a sieve, an air classifier, etc.

Synthesis examples of the negative electrode active materials which can be used in the present invention are described below only for illustrative purposes but not for limitation.

SYNTHESIS EXAMPLE 1

Tin monoxide (13.5 g) and silicon dioxide (6.0 g) were dry blended, put in an alumina crucible, heated up to 1000°

C. at a rate of 15° C./min in an argon atmosphere, calcined at that temperature for 12 hours, and cooled to room temperature at a rate of 10° C./min. The calcined product was taken out of the furnace, coarsely ground, and pulverized in a jet mill to obtain $SnSiO_3$ having an average particle size of 4.5 μm (hereinafter designated compound 1-A).

As a result of X-ray diffractometry using CuKα rays, the resulting product showed a broad scattering band with its peak around 28° in terms of 2θ and no diffraction line assigned to a crystalline structure between 2θ=40° and 70°.

In the same manner as described above, the following compounds were synthesized starting with the stoichiometric amounts of the respective raw materials. These compounds exhibited a broad scattering band with its peak between 2θ=20° and 40° in X-ray diffractometry using CuKα rays. A ratio of the maximum intensity of diffraction due to a crystalline structure, if any observed, which appears between 2θ=40° and 70° (taken as B; B is zero when no diffraction line is observed) to the peak intensity of the broad scattering band appearing between 2θ=20° and 40° (taken as A), i.e., a B/A ratio is given in the parentheses together with the compound number.

$SnGeO_3$ (compound 1-B; B/A=0)
$SnSi_{0.8}P_{0.1}B_{0.1}O_3$ (compound 1-C; B/A=0)
$SnSi_{0.9}Ge_{0.1}O_3$ (compound 1-D; B/A=0)
$SnSi_{0.9}Pb_{0.1}O_3$ (compound 1-E; B/A=0)
$SnSi_{0.5}Ge_{0.5}O_3$ (compound 1-F; B/A=0)
$SnSi_{0.5}Pb_{0.5}O_3$ (compound 1-G; B/A=0.3)
$SnGe_{0.9}Pb_{0.1}O_3$ (compound 1-H; B/A=0)
$SnSi_{0.8}O_{2.4}$ (compound 1-I; B/A=0.1)
$SnSi_{1.2}O_{3.4}$ (compound 1-J; B/A=0)
$SnSi_{1.5}O_4$ (compound 1-K; B/A=0)
$PbSiO_3$ (compound 1-L; B/A=0)
$PbGeO_3$ (compound 1-M; B/A=0)
$PbSi_{0.9}Ge_{0.1}O_3$ (compound 1-N; B/A=0)
$SnPO_{3.5}$ (compound 1-O; B/A=0)
$SnBO_{2.5}$ (compound 1-P; B/A=0)
$SnSi_{0.9}O_{2.8}$ (compound 1-Q; B/A=0)

SYNTHESIS EXAMPLE 2

Tin monoxide (1.35 g) and silicon dioxide (0.6 g) were dry blended, put in an alumina crucible, heated up to 1000° C. at a rate of 15° C./min in an argon atmosphere, calcined at that temperature for 10 hours, and spread on a stainless steel foil in an argon atmosphere for quenching. The resulting product was coarsely ground and pulverized in a vibration mill to obtain $SnSiO_3$ having an average particle size of 3.5 μm (hereinafter designated compound 2-A).

As a result of X-ray diffractometry, the B/A ratio of the product was found to be 9.5.

SYNTHESIS EXAMPLE 3

Tin dioxide (15.1 g) and silicon dioxide (0.6 g) were dry blended, put in an alumina crucible, calcined at 1200° C. for 10 hours in air, cooled to room temperature, and taken out of the calcination furnace. The calcined product was pulverized in a jet mill to obtain $SnSi_{0.1}O_{2.2}$ having an average particle size of 4 μm (hereinafter designated compound 3-A). As a result of X-ray diffractometry, the B/A ratio was 0.

In the same manner, the following compounds were synthesized starting with the stoichiometric amounts of the respective raw materials.

$SnSi_{0.3}O_{2.6}$ (compound 3-B; B/A=2.4)
$SnGe_{0.1}O_{2.2}$ (compound 3-C; B/A=7.4)
$SnGe_{0.3}O_{2.6}$ (compound 3-D; B/A=4.7)
$SnPb_{0.1}O_{2.2}$ (compound 3-E; B/A=7.5)
$SnPb_{0.1}O_{2.6}$ (compound 3-F; B/A=16.5)
$SnSi_{0.1}Ge_{0.1}O_{2.4}$ (compound 3-G; B/A=9.5)
$SnSi_{0.1}Pb_{0.1}O_{2.4}$ (compound 3-H; B/A=29.1)
$SnSi_{0.01}O_{2.02}$ (compound 3-I; B/A=7.1)
$SnSi_{1.5}O_5$ (compound 3-J; B/A=0)
$SnSi_2O_6$ (compound 3-K; B/A=0)
$PbSi_{0.1}O_{2.2}$ (compound 3-L; B/A=5.3)
$PbGe_{0.3}O_{2.6}$ (compound 3-M; B/A=2.3)
$GeSi_{0.1}O_{2.2}$ (compound 3-N; B/A=0)
$GeSi_{0.3}O_{2.6}$ (compound 3-O; B/A=0)
$SnP_{0.3}O_{2.75}$ (compound 3-P; B/A=1.4)
$SnB_{0.3}O_{2.45}$ (compound 3-Q; B/A=6.4)

SYNTHESIS EXAMPLE 4

Tin monoxide (13.5 g), silicon dioxide (4.8 g), and diphosphorus pentoxide (1.42 g) were weighed in dry air at a temperature from dew point to 50° C. and dry blended in a ball mill in this dry air. The blend was put in an alumina crucible, heated to 1100° C. at a rate of 10° C./min in an argon atmosphere, calcined at that temperature for 10 hours, and cooled to room temperature at a rate of 8.3° C./min to obtain a glassy compound. The compound was pulverized in a jet mill and air classified to obtain $SnSi_{0.8}P_{0.1}O_{3.2}$ having an average particle size of 4 μm (hereinafter designated compound 4-A). As a result of X-ray diffractometry, the B/A ratio was 0.

In the same manner, the following compounds were synthesized starting with the stoichiometric amounts of the respective raw materials. $Sb_2O_3$ was used as an antimony source.

$SnSi_{0.9}P_{0.1}O_{3.05}$ (compound 4-B; B/A=0)
$SnSi_{0.7}P_{0.3}O_{3.15}$ (compound 4-C; B/A=0)
$SnSi_{0.5}P_{0.5}O_{3.25}$ (compound 4-D; B/A=0)
$SnSi_{0.2}P_{0.8}O_{3.4}$ (compound 4-E; B/A=0)
$SnSi_{0.8}P_{0.1}Sb_{0.1}O_3$ (compound 4-F; B/A=0.5)

SYNTHESIS EXAMPLE 5

Tin monoxide (10.78 g), silicon dioxide (3.6 g), stannous pyrophosphate (4.11 g), and germanium dioxide (2.1 g) were dry blended in a ball mill, put in an alumina crucible, heated to 1100° C. at a rate of 10° C./min in an argon atmosphere, calcined at that temperature for 10 hours, and thrown into water in an argon atmosphere for rapid cooling to obtain a glassy compound. The resulting compound was wet ground in a ball mill using water as a grinding medium and then, as dispersed in water, passed through a 25 μm sieve to remove coarse particles. Water was removed by decantation, and the solid was dried at 150° C. for 1 hour to obtain $SnSi_{0.6}P_{0.2}Ge_{0.2}O_{3.1}$ having an average particle size of 3.1 μm (hereinafter designated compound 5-A). As a result of X-ray diffractometry, the B/A ratio was 0.

In the same manner, the following compounds were synthesized starting with the stoichiometric amounts of the respective raw materials. $Al_2O_3$ was used as an aluminum source.

$SnSi_{0.7}Ge_{0.1}P_{0.2}O_{3.1}$ (compound 5-B; B/A=0)
$SnSi_{0.6}Ge_{0.4}P_{0.1}O_{3.25}$ (compound 5-C; B/A=0)
$SnSi_{0.2}Ge_{0.1}P_{0.7}O_{3.35}$ (compound 5-D; B/A=0)

$SnSi_{0.8}P_{0.1}Al_{0.1}O_3$ (compound 5-E; B/A=0)
$SnSi_{0.8}P_{0.2}Al_{0.1}O_{3.25}$ (compound 5-F; B/A=0)
$SnSi_{0.6}P_{0.1}Al_{0.3}O_{2.9}$ (compound 5-G; B/A=0)
$SnSi_{0.6}P_{0.3}Al_{0.1}O_{3.1}$ (compound 5-H; B/A=0)
$SnSi_{0.3}P_{0.7}Al_{0.1}O_{3.5}$ (compound 5-I; B/A=1.5)
$SnSi_{0.8}P_{0.2}O_{3.1}$ (compound 5-J; B/A=0)
$SnSi_{0.6}P_{0.4}Al_{0.2}O_{3.5}$ (compound 5-K; B/A=0)
$SnSi_{0.1}P_{0.9}Al_{0.1}O_{3.6}$ (compound 5-L; B/A=0)
$SnSi_{0.8}Al_{0.2}P_{0.2}O_{3.4}$ (compound 5-M; B/A=0)
$SnSi_{0.7}Al_{0.2}P_{0.3}O_{3.45}$ (compound 5-N; B/A=0)
$SnSi_{0.4}Al_{0.2}P_{0.6}O_{3.6}$ (compound 5-O; B/A=0)
$SnPAl_{0.1}O_{3.65}$ (compound 5-P; B/A=0)

The positive electrode active material which can be used in the present invention may be a transition metal oxide capable of reversibly intercalating and deintercalating a lithium ion but is preferably a lithium-containing transition metal oxide.

Lithium-containing transition metal oxides which can be used as a positive electrode active material include, for preference, lithium-containing oxides of Ti, V, Cr, Mn, Fe, Co, Ni, Cu, Mo or W. The oxide may contain other alkali metals (the group IA and IIA elements) in addition to Li and/or semimetals, such as Al, Ga, In, Ge, Sn, Pb, Sb, and Bi. The ratio of these additional elements is preferably up to 10 mol % based on the total amount of $M^1$ and $M^2$.

Preferred of the Li-containing transition metal oxides as a positive electrode active material are those prepared from a mixture of a lithium compound and at least one compound of a transition metal selected from Ti, V, Cr, Mn, Fe, Co, Ni, Mo, and W at a lithium compound/total transition metal compounds molar ratio of 0.3 to 2.2.

More preferred are those prepared from a mixture of a lithium compound and at least one compound of a transition metal selected from V, Cr, Mn, Fe, Co, and Ni at a lithium compound/total transition metal compounds molar ratio of from 0.3 to 2.2.

The most preferred are those represented by formula $Li_xMO_z$ (M represents at least one transition metal selected from Co, Mn, Ni, V, and Fe; x is from 0.3 to 1.2; and z is from 1.4 to 3).

Suitable examples of the lithium-containing metal oxide positive electrode active material which can be preferably used in the present invention include $Li_xCoO_2$, $Li_xNiO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_z$, $Li_xMn_cFe_{2-c}O_4$, a mixture of $Li_xMn_2O_4$ and $MnO_2$, a mixture of $Li_{2-x}MnO_3$ and $MnO_2$, a mixture of $Li_xMn_2O_4$, $Li_{2-x}MnO_3$, and $MnO_2$ (wherein x=0.6 to 1.2; a=0.1 to 0.9; b=0.8 to 0.98; c=1.6 to 1.96; and z=2.01 to 5).

The most preferred examples of the lithium-containing metal oxide positive electrode active materials include $Li_xCoO_2$, $Li_xNiO_2$, $Li_xCo_aNi_{1-a}O_2$, $Li_xMn_2O_4$, and $Li_xCO_bV_{1-b}O_z$ (wherein x=0.7 to 1.04; a=0.1 to 0.9; b=0.9 to 0.98; z=2.02 to 2.3).

The value x in the above formulae is the value before commencement of charging and discharging and varies with charge and discharge.

In the synthesis of a positive electrode active material, chemical intercalation of a lithium ion into a transition metal oxide is preferably achieved by reacting metallic lithium, a lithium alloy or butyl lithium with the transition metal oxide.

The above-described lithium-containing transition metal oxide as a positive electrode active material can be synthesized by mixing a lithium compound and at least one transition metal compound, followed by calcination (calcination method) or by reacting these materials in a solution (solution method). The calcination method is preferred.

Calcination is carried out at a calcination temperature selected from the range in which at least part of the mixed compounds may be decomposed and melted, for example, from 250° to 2000° C., preferably from 350° to 1500° C.

While not limiting, calcination for the synthesis of a positive electrode active material is preferably carried out in air or a gas having a relatively high oxygen concentration (e.g., about 30% or higher), while that for a negative electrode active material is preferably performed in air, a gas having a reduced oxygen concentration (e.g., about 10% or less), or an inert gas (e.g., nitrogen or argon).

While not limiting, the positive electrode active material to be used in the present invention preferably has an average particle size of from 0.1 to 50 µm.

The resulting positive electrode active material can be ground to the desired size by means of well-known grinding machines or classifiers, such as a mortar, a ball mill, a vibration ball mill, a satellite ball mill, a planetary ball mill, spinning air flow type jet mill, and a sieve.

The negative electrode active material to be used in the present invention can be obtained by chemically intercalating lithium into a negative electrode active material precursor. For example, intercalation of a lithium ion into the precursor oxide is achieved by reacting the precursor with metallic lithium, a lithium alloy or butyl lithium, or through an electrochemical means.

In the present invention, electrochemical intercalation of lithium into a precursor oxide is particularly preferred. Electrochemical intercalation of a lithium ion can be performed by discharging an oxidation-reduction system, either an open system (electrolysis) or a closed system (battery), composed of a target oxide (i.e., the negative electrode active material precursor according to the present invention) as a positive electrode active material, and a nonaqueous electrolyte containing a metallic lithium and a lithium salt as a negative electrode active material. Alternatively and preferably, electrochemical intercalation can be achieved by charging an oxidation-reduction system, either an open system (electrolysis) or a closed system (battery), composed of a lithium-containing transition metal oxide as a positive electrode active material, a negative electrode active material precursor as a negative electrode active material, and a nonaqueous electrolyte containing a lithium salt.

The amount of lithium to be intercalated into an oxide is not particularly limited. For example, lithium is preferably intercalated to reach 0.05 V, more preferably 0.1 V, most preferably 0.15 V, with respect to Li—Al (80–20% by weight). The above amount of lithium intercalated corresponds to 3 to 10 equivalents, and the ratio of a negative electrode active material to a positive electrode active material is decided in conformity with this equivalent amount. It is preferable to use a negative electrode active material in an amount based on the calculated ratio multiplied by 0.5 to 2. Where any other substance than a positive electrode active material, e.g., metallic lithium, a lithium alloy or butyl lithium, is used as a lithium source, the amount of a positive electrode active material to be used is decided in conformity with the equivalent amount of lithium released (i.e., deintercalated) from the negative electrode active material. In this case, too, the positive electrode active material is preferably used in an amount based on the calculated ratio multiplied by 0.5 to 2.

The precursor oxide of the present invention has a crystal structure but, as lithium is intercalated, the oxide reduces its crystal properties to turn amorphous. Therefore, the compound which reversibly undergoes oxidation and reduction as a negative electrode active material is assumed to have a highly amorphous structure. Accordingly, the precursor oxide may have any of a crystal structure, an amorphous structure, or a mixed structure thereof.

Negative electrode active materials which can be used in combination with the negative electrode active material of the present invention include metallic lithium, lithium alloys (e.g., alloys with Al, Al—Mn, Al—Mg, Al—Sn, Al—In or Al—Cd), and calcined carbonaceous compounds capable of intercalating and deintercalating a lithium ion or metallic lithium. The purpose of the combined use of metallic lithium or a lithium alloy is not to utilize the dissolution-precipitation reaction of metallic lithium, etc. as an electrode reaction but to intercalate lithium into a precursor oxide within a battery.

An electrode material mixture to be used in the present invention comprises the above-described active material, a conducting agent, a binder, a filler, and so forth.

The conducting agent may be any electron-conducting material which undergoes no chemical change in an assembled battery. Suitable conducting agents include natural graphite (scale graphite, flake graphite, lumpy graphite, etc.), artificial graphite, carbon black, acetylene black, Ketjen black, carbon fiber, metal powders (e.g., copper, nickel, aluminum or silver powder), metallic fibers, polyphenylene derivatives, and mixtures of two or more thereof. A combination of graphite and acetylene black is particularly preferred. The graphite/acetylene black combination may further contain nickel powder. The chain nickel powder is particularly preferred.

The conducting agent is preferably used in an amount of from 1 to 50% by weight, more preferably from 2 to 30% by weight. Carbon or graphite is preferably used in an amount of from 2 to 20% by weight. Where a precursor oxide has been given electron conductivity by doping, for example, $SnO_2$ with Sb, the above-mentioned amount of the conducting agent can be decreased, e.g., to 0 to 10% by weight.

The examples of binder include polysaccharides, thermoplastic resins, and rubbery polymers; such as starch, polyvinyl alcohol, carboxymethyl cellulose, hydroxypropyl cellulose, regenerated cellulose, diacetyl cellulose, polyvinyl chloride, polyvinyl pyrrolidone, tetrafluoroethylene, polyvinylidene fluoride, polyethylene, polypropylene, ethylene-propylene-diene terpolymers (EPDM), sulfonated EPDM, styrene-butadiene rubbers, polybutadiene, fluorine rubbers, polyethylene oxide, and mixtures of two or more thereof. In using a compound having a functional group reactive with lithium, such as a polysaccharide, it is preferable to deactivate the functional group by addition of a compound having an isocyanate group. The binder is used in an amount of preferably 1 to 50% by weight, more preferably 2 to 30% by weight, based on the positive electrode active material.

The filler to be used in the present invention is not particularly limited as long as it is a fibrous material undergoing no chemical change in an assembled battery. Suitable examples of fillers include fibers of polyolefins (e.g., polypropylene or polyethylene), glass fiber, and carbon fiber. While not limiting, the filler is preferably used in an amount of from 0 to 30% by weight, based on the positive electrode active material.

The nonaqueous electrolytic solution which can be used in the nonaqueous secondary battery of the present invention consists of at least one organic solvent and at least one lithium salt soluble in the solvent. Suitable examples of organic solvents include aprotic solvents, such as propylene carbonate, ethylene carbonate, butylene carbonate, dimethyl carbonate, diethyl carbonate, γ-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, methyl propionate, ethyl propionate, phosphoric triesters, trimethoxymethane, dioxolane derivatives, sulfolane, 3-methyl-2-oxazolidinone, propylene carbonate derivatives, tetrahydrofuran derivatives, ethyl ether, and 1,3-propanesultone. These solvents may be used either individually or in combination of two or more thereof. Suitable examples of lithium salts soluble in these solvents include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, lower fatty acid salts, $LiAlCl_4$, $LiCl$, $LiBr$, $LiI$, chloroboran lithium, and lithium tetraphenylborate. These lithium salts may be used either individually or in combination of two or more thereof. In particular, a solution of $LiCF_3SO_3$, $LiClO_4$, $LiBF_4$ and/or $LiPF_6$ in a mixed solvent of propylene carbonate or ethylene carbonate and 1,2-dimethoxyethane and/or diethyl carbonate is a preferred electrolytic solution. A preferred electrolytic solution contains at least ethylene carbonate and $LiPF_6$.

The amount of the electrolytic solution to be used in a battery is not particularly limited and can be selected according to the amounts of the positive and negative electrode active materials or the size of the battery.

In using a mixed solvent, the mixing ratio is not particularly limited. In the case of a mixed solvent consisting of propylene carbonate or ethylene carbonate or butylene carbonate and 1,2-dimethoxyethane and/or diethyl carbonate, for example, a preferred ratio of propylene carbonate or ethylene carbonate or butylene carbonate to 1,2-dimethoxyethane and/or diethyl carbonate is 0.4/0.6 to 0.6/0.4 by volume, with a preferred ratio of ethylene carbonate to butylene carbonate being 0.4/0.6 to 0.6/0.4 by volume, and a preferred ratio of 1,2-dimethoxyethane to diethyl carbonate being 0.4/0.6 to 0.6/0.4 by volume.

While not limiting, the concentration of the supporting electrolyte is preferably from 0.2 to 3 mol per liter of the electrolytic solution.

In addition to the electrolytic solution, inorganic or organic solid electrolytes may also be employed.

Examples of suitable inorganic solid electrolytes include lithium nitride, a lithium halide, and a lithium oxyacid salt. Among them preferred are $Li_3N$, $LiI$, $Li_5NI_2$, $Li_3N$—$LiI$—$LiOH$, $LiSiO_4$, $LiSiO_4$—$LiI$—$LiOH$, $xLi_3PO_4$-$(1-x)Li_4SiO_4$, $Li_2SiS_3$, and phosphorus sulfide compounds.

Examples of suitable organic solid electrolytes include polyethylene oxide derivatives or polymers containing the same, polypropylene oxide derivatives or polymers containing the same, polymers containing an ion dissociation group, a mixture of a polymer containing an ion dissociation group and the above-mentioned aprotic electrolytic solution, and phosphoric ester polymers. A combination of polyacrylonitrile and an electrolytic solution and a combination of an organic solid electrolyte and an inorganic solid electrolyte are also known.

As a separator, an insulating thin film having high ion permeability and prescribed mechanical strength is used. A sheet or nonwoven fabric made of an olefin polymer (e.g., polypropylene), glass fiber or polyethylene is usually employed for their organic solvent resistance and hydrophobic properties. The pore size of the separator is selected from the range generally used for batteries, e.g., from 0.01 to 10 μm. The thickness of the separator is selected from the range generally used for batteries, e.g., from 5 to 300 μm.

For the purpose of improving charge and discharge characteristics, the electrolytic solution may contain other compounds, such as pyridine, triethyl phosphite, triethanolamine, a cyclic ether, ethylenediamine, n-glyme, hexaphosphoric acid triamide, a nitrobenzene derivative, sulfur, a quinoneimine dye, an N-substituted oxazolidinone, an N,N'-substituted imidazolidinone, an ethylene glycol dialkyl ether, a quaternary ammonium salt, polyethylene glycol, pyrrole, 2-methoxyethanol, $AlCl_3$, a monomer providing a conductive polymeric active material, triethylenephosphoramide, a trialkylphosphine, morpholine, an aryl compound having a carbonyl group, hexamethylphosphoric triamide, a 4-alkylmorpholine, a bicyclic tertiary amine, an oil, a quaternary phosphonium salt, and a tertiary sulfonium salt.

In order to make the electrolytic solution incombustible, a halogen-containing solvent, such as carbon tetrachloride or trifluorochloroethylene, may be added to the electrolytic solution. In order to make the electrolytic solution resistant to high-temperature preservation, carbonic acid gas may be incorporated thereto.

The positive or negative electrode active material mixture may contain an electrolytic solution or an electrolyte. For example, it is known to add the above-mentioned ion-conductive polymer, nitromethane, or an electrolytic solution to the active material mixture.

The surface of the positive electrode active material may be modified by treating with an esterification agent, a chelating agent, a conductive high polymer, polyethylene oxide, and the like.

The surface of the negative electrode active material may also be modified by, for example, providing a layer comprising an ion-conductive polymer or polyacetylene or treating with LiCl.

A collector for an active material may be made of any electron-conducting substance which undergoes no chemical change in an assembled battery. Suitable examples of materials of a collector for the positive pole include stainless steel, nickel, aluminum, titanium, calcined carbon; and aluminum or stainless steel with its surface treated with carbon, nickel, titanium or silver. Suitable examples of materials of a collector for the negative pole include stainless steel, nickel, copper, titanium, aluminum, calcined carbon; copper or stainless steel with its surface treated with carbon, nickel, titanium or silver; and an Al—Cd alloy. These materials may be subjected to surface oxidation. The collector may have a variety of forms, such as a foil, a film, a sheet, a net, a punched sheet, a lath, a porous body, a foamed body, a fibrous body, and so on. While not limiting, the thickness of the collector is preferably from 1 to 500 μm.

Drying or dehydration of a sheet electrode is conducted by a general means, preferably hot air, vacuum, infrared rays, far infrared rays, electron rays, and low humidity air, either alone or in combination thereof. The drying temperature preferably ranges from 80° to 350° C., and more preferably from 100° to 250° C. From the viewpoint of charge and discharge cycle characteristics, drying is preferably effected so such an extent that the positive and negative electrode material mixtures and the electrolyte may each have a water content of not more than 500 ppm, with the total battery water content being not more than 2000 ppm.

Compression of the sheet electrode may be carried out by a generally employed means, and preferably by pressing in a mold or calendering. The pressing pressure is preferably from 0.2 to 3 t/cm$^2$. The pressing speed in calendering is preferably from 0.1 to 50 m/min. The pressing temperature is preferably from room temperature to 200° C.

The cylindrical battery of the present invention is assembled as follows. Reference is made to FIG. 1. A laminate of positive sheet electrode 8, negative sheet electrode 9, and separator 10 is rolled into cylinder (or ellipsoid), and the roll is inserted into battery case 11. The sheets and the case are electrically connected, and an electrolytic solution is poured into the case. The case is sealed with sealing top 12 to complete a battery. In FIG. 1, numerals 13 and 14 indicate a gasket and a safety valve, respectively. A safety valve may be used as a sealing top. Various known safety elements may also be provided. For example, a fuse, a bimetal, a PTC element, etc. may be used as an element for prevention of over-current. In addition to a safety valve, an increase in inner pressure may be coped with by making cuts on a battery case, making cracks in a gasket, or making cracks in a sealing top. A countermeasure for overcharge or overdischarge may be incorporated into the circuit of a charging machine.

A battery case and a lead-out plate are made of an electrically conductive metal or alloy, such as iron, nickel, titanium, chromium, molybdenum, copper, aluminum, and alloys thereof. The cap, case, sheet and lead can be joined by a known welding technique, such as direct current or alternating current electric welding, laser welding or ultrasonic welding. The sealing top can be sealed with a known sealing compound, such as asphalt.

The charge of the battery of the present invention may be either constant current charge or constant voltage charge. The cut-off voltage in charging, which is detected in terms of either voltage or time, is 3.9 to 4.25 V, preferably 3.95 to 4.2 V. More preferably charging is conducted with the current per unit area of the opposing electrode being 0.1 to 10 mA/cm$^2$, particularly 0.5 to 6 mA/cm$^2$.

The detection accuracy of the cut-off voltage in voltage-controlled charging is not more than 3%, preferably 2% or less. In order to obtain this detection accuracy, the precision of the parts to be used is increased, and the variation breadth from a standard power source is adjusted within the above range.

The application of the nonaqueous secondary battery of the present invention is not particularly limited. For example, it is useful in electronic equipment, such as notebook-size color or monochromatic computers, pen input computers, pocket-size (palmtop) computers, notebook-size word processors, pocket-size word processors, electronic book players, pocket phones, wireless phone extensions, pagers, handy terminals, portable facsimiles, portable copying machines, portable printers, headphone stereos, video cameras, liquid crystal TV sets, handy cleaners, portable CD, mini disk systems, electrical shavers, machine translation systems, land mobile radiotelephones, transceivers, electrical tools, portable calculators, memory cards, tape recorders, radios, backup powers, and so on; automobiles, electrically-powered vehicles, motors, lights, toys, family (home) computers, load conditioners, irons, watches, stroboscopic lamps, cameras, medical equipment (e.g., pacemakers, hearing aids, and massaging machines); military equipment; and spacecraft equipment. The nonaqueous secondary battery of the present invention may be used in combination with solar batteries.

The present invention will now be illustrated in greater detail with reference to Examples, but the present invention should not be construed as being limited thereto. Unless otherwise indicated, all the percents are by weight.

EXAMPLE 1

Petroleum pitch was subjected to oxygen crosslinking to a degree of 10 to 20% and then calcined in an inert gas at 1000° C. The true specific gravity of the calcined product measured with a pycnometer was 1.54 g/cm³. The product was pulverized in a jet mill to an average particle size of 20 µm.

A negative electrode material mixture was prepared by mixing 90% of the above-prepared particles as a negative electrode active material with 10% of polyvinylidene fluoride (hereinafter abbreviated as PVDF) as a binder. The mixture was dispersed in N-methylpyrrolidone, and the dispersion was applied on both sides of a 10 µm thick copper foil by an extrusion coating method and, after drying, compressed by calendering and cut to size to obtain a 41 mm wide and 700 mm long negative electrode having a 80 µm thick electrode material mixture on each side thereof.

A mixture of 87% of commercially available LiCoO₂ as a positive electrode active material, 6% of flake graphite, 3% of acetylene black, and, as binders, 3% of an aqueous dispersion of polytetrafluoroethylene and 1% of sodium polyacrylate was kneaded with water, and the resulting slurry was applied on both sides of a 20 µm thick aluminum foil, dried, and compressed in the same manner as for the negative electrode. The resulting sheet was cut to size to obtain a 41 mm wide and 670 mm long positive electrode, in which the electrode material mixture on each side thereof had the thickness shown in Table 1 below, with the total coating thickness on both sides being 150 µm.

A laminate of the positive electrode, the negative electrode, and a separator was rolled up into cylinder and assembled into a battery having the structure shown in FIG. 1. The state of the sheet electrodes during rolling was observed with the naked eye, and the winding properties were evaluated according to the following standard.

Good . . . No problem

Medium . . . Cracks and wrinkles on the coated surface were markedly observed.

Bad . . . The electrode material mixture peeled off the collector.

Ten batteries were prepared for each run and tested by repeating charging at a constant current of 300 mA to a cut-off voltage of 4.2 V and discharging at a constant current of 700 mA to a cut-off voltage of 2.7 V. An average capacity of the 10th cycle (hereinafter referred to as an initial capacity) and an average capacity of the 150th cycle of the 10 batteries were obtained. The results are shown in Table 1.

As is apparent from the results of Table 1, excellent winding properties and cycle characteristics are obtained when the coating thickness on the inner side of a collector is smaller than that on the outer side of the collector. It is seen that a preferred coating thickness of the inner side ranges from 60 to 97% of that on the outer side.

EXAMPLE 2

Positive and negative electrodes were prepared and evaluated in the same manner as in Example 1, except for varying the total coating thickness of the negative electrode and the positive electrode (exclusive of the collectors) as shown in Table 2 below. In Table 2, the results of the charge and discharge cycle test are expressed in terms of capacity retention, i.e., a ratio (%) of the capacity of the 150th cycle to the initial capacity.

TABLE 2

| Run No. | Total Thickness of Positive and Negative Electrodes (µm) | Inner Side/ Outer Side Thickness Ratio (%) | Winding Properties | Capacity Retention (%) | Remark |
|---|---|---|---|---|---|
| 1 | 290 | 81.5 | good | 91.3 | invention |
| 2 | 310 | 81.5 | good | 91.5 | invention |
| 3 | " | 100 | medium | 87.5 | comparison |
| 4 | 330 | 81.5 | good | 92.7 | invention |
| 5 | " | 100 | medium | 81.2 | comparison |
| 6 | 370 | 81.5 | good | 93.6 | invention |
| 7 | " | 100 | bad | 80.0 | comparison |
| 8 | 420 | 81.5 | good | 92.0 | invention |
| 9 | " | 100 | bad | 78.9 | comparison |
| 10 | 520 | 81.5 | good | 91.5 | invention |
| 11 | " | 100 | bad | 77.6 | comparison |
| 12 | 620 | 81.5 | medium | 90.0 | invention |
| 13 | " | 100 | bad | 73.1 | comparison |

The winding properties and cycle characteristics tend to be reduced as the total coating thickness of the positive and negative electrodes increases over 330 µm, but, as is apparent from the results of Table 2, the present invention makes it possible to retain satisfactory winding properties and cycle characteristics even with the total coating thickness of 330 µm or more. However, if the total coating thickness exceeds 600 µm, the sheet electrodes cannot be prevented from cracking, and the cycle characteristics begin to be reduced. It is thus understood that a preferred total coating thickness of positive and negative electrodes ranges from 330 to 600 µm.

TABLE 1

| Run No. | Coating Thickness Inner Side (µm) | Coating Thickness Outer Side (µm) | Inner Side/ Outer Side Thickness Ratio (%) | Winding Properties | Initial Capacity (mAh) | Capacity of 150 Cycles (mAh) | Remark |
|---|---|---|---|---|---|---|---|
| 1 | 75 | 75 | 100 | medium | 1020 | 887 | comparison |
| 2 | 74 | 76 | 97.4 | medium | 1020 | 899 | invention |
| 3 | 72 | 78 | 92.3 | good | 1025 | 912 | invention |
| 4 | 70 | 80 | 87.5 | qood | 1021 | 915 | invention |
| 5 | 65 | 85 | 76.5 | good | 1024 | 910 | invention |
| 6 | 61 | 89 | 68.5 | good | 1020 | 900 | invention |
| 7 | 55 | 95 | 57.9 | good | 1019 | 898 | invention |
| 8 | 79 | 71 | 111 | bad | 1017 | 880 | comparison |

EXAMPLE 3

A negative electrode material mixture was prepared by mixing 83% of compound 4-D prepared in Synthesis Example 1, 9% of flake graphite, 3% of acetylene black, and 4% of PVDF. The mixture was kneaded with water together with 1% of carboxymethyl cellulose to prepare a slurry.

The slurry was applied on both sides of a 10 μm thick copper foil by an extrusion coating method, dried, and compressed by calendering and cut to size to obtain a 41 mm wide and 270 mm long negative electrode having a 36 μm thick electrode material mixture on each side thereof.

A mixture of 94% of commercially available LiCoO$_2$ as a positive electrode active material, 3% of acetylene black, and 2% of a 2-ethylhexyl acrylate/acrylonitrile/acrylic acid (8:1:0.5) copolymer was kneaded with water together with 1% of carboxymethyl cellulose in the same manner as for the negative electrode material mixture. The resulting slurry was applied on both sides of a 20 μm thick aluminum foil, dried, and compressed in the same manner as for the negative electrode. The resulting sheet was cut to size to obtain a 41 mm wide and 255 mm long positive electrode, in which the electrode material mixture on each side thereof had the coating thickness shown in Table 3 below, with the total coating thickness on both sides being 260 μm.

The winding properties of the sheet electrodes and the cycle characteristics of the assembled batteries were evaluated in the same manner as in Example 1. The results obtained are shown in Table 3.

TABLE 3

| Run No. | Coating Thickness Inner Side (μm) | Coating Thickness Outer Side (μm) | Inner Side/ Outer Side Thickness Ratio (%) | Winding Properties | Capacity Initial Capacity (mAh) | Capacity of 150 Cycles (mAh) | Remark |
|---|---|---|---|---|---|---|---|
| 1 | 130 | 130 | 100 | medium | 810 | 699 | comparison |
| 2 | 125 | 135 | 92.6 | good | 812 | 715 | invention |
| 3 | 118 | 142 | 83.1 | good | 812 | 755 | invention |
| 4 | 100 | 160 | 62.5 | good | 810 | 737 | invention |
| 5 | 95 | 165 | 57.6 | good | 809 | 712 | invention |
| 6 | 135 | 125 | 108 | good | 808 | 654 | comparison |

As is apparent from the results of Table 3, the effects of the smaller coating thickness of the inner side electrode material mixture as compared with the outer side electrode material in a positive electrode are significantly manifested where the positive electrode has a larger coating thickness than a negative electrode as in this Example. It is also seen that the battery performance are satisfactory particularly with the coating thickness on the inner side ranging from 60 to 97% of that on the outer side.

Separately, a negative electrode was prepared in the same manner as in Example 1, except that the total coating thickness on both sides was 170 μm (hereinafter designated negative electrode A-1). A positive electrode was prepared in the same manner as in Example 3, except that the total coating thickness on both sides was 162 μm. The laminate of the negative and positive electrodes having a total coating thickness of 332 μm was rolled and assembled into a battery having the same size as described above. As a result of evaluation, the initial capacity was about ⅔ of that of the battery prepared by using the above-described negative electrode comprising compound 4-D (designated negative electrode 4-D). Therefore, the cycle characteristics were re-evaluated by calculating the capacity retention (%) after 150 cycles based on the initial capacity.

TABLE 4

| Run No. | Inner Side/ Outer Side Thickness Ratio (%) | Capacity Retention Negative Electrode A-1 (%) | Capacity Retention Negative Electrode 4-D (%) | Remark |
|---|---|---|---|---|
| 1 | 100 | 86.3 | 86.5 | comparison |
| 2 | 92.6 | 88.1 | 88.0 | invention |
| 3 | 83.1 | 93.0 | 90.1 | invention |
| 4 | 62.5 | 91.0 | 88.5 | invention |
| 5 | 57.6 | 88.0 | 87.9 | invention |
| 6 | 108 | 69.8 | 70.0 | comparison |

It is seen from the results in Table 4 that the effects of the present invention produced by changing the coating thickness ratio are displayed more remarkably in using negative electrode 4-D as compared with in using negative electrode A-1.

EXAMPLE 4

Tin monoxide (13.5 g) and silicon monoxide (6.0 g) were dry blended, put in an alumina crucible, heated up to 1000° C. at a rate of 10° C./min in an argon atmosphere, calcined at that temperature for 12 hours, and cooled to room temperature at a rate of 6° C./min. The calcined product was taken out of the furnace, coarsely ground, and pulverized in a jet mill to obtain SnSiO$_3$ having an average particle size of 5 μm.

A negative electrode material mixture was prepared by mixing 83% of the above-prepared SnSiO$_3$ as a negative electrode active material, 9% of flake graphite, 3% of acetylene black, and 4% of PVDF as a binder. The mixture was kneaded with water together with 1% of carboxymethyl cellulose to prepare a slurry.

The slurry was applied on both sides of a 10 μm thick copper foil by an extrusion coating method, dried, and compressed by calendering and cut to size to obtain a 41 mm wide and 270 mm long negative electrode having a 36 μm thick electrode material mixture on each side thereof.

The resulting negative electrode was combined with the same positive electrode as used in Example 3 and assembled into a cylindrical battery and evaluated in the same manner as in Example 3. As a result, satisfactory battery performance was exhibited similarly to Example 3.

EXAMPLE 5

Batteries were prepared in the same manner as in Example 3, except that the positive electrode had the inner side/outer side coating thickness ratio shown in Table 5 below. Ten batteries for each run were tested by repeating charging at a constant current shown in Table 5 to a cut-off voltage of 4.15 V and discharging at a constant current shown in Table 5 to a cut-off voltage of 2.7 V. An average initial capacity and an average capacity after 200 cycles of the 10 batteries were calculated to obtain a capacity retention (%). The results are shown in Table 5.

TABLE 5

| Run No. | Coating Thickness Inner Side (μm) | Coating Thickness Outer Side (μm) | Inner Side/Outer Side Thickness Ratio (%) | Current (mA) | Capacity Retention (%) | Remarks |
| --- | --- | --- | --- | --- | --- | --- |
| 1 | 130 | 130 | 100 | 200 | 82.2 | comparison |
| 2 | " | " | " | 1000 | 80.5 | " |
| 3 | " | " | " | 2000 | 72.4 | " |
| 4 | 120 | 140 | 85.7 | 200 | 92.8 | invention |
| 5 | " | " | " | 1000 | 91.6 | " |
| 6 | " | " | " | 2000 | 90.0 | " |
| 7 | 115 | 145 | 79.3 | 200 | 92.0 | " |
| 8 | " | " | " | 1000 | 91.1 | " |
| 9 | " | " | " | 2000 | 89.8 | " |
| 10 | 135 | 125 | 108 | 200 | 80.1 | comparison |
| 11 | " | " | " | 1000 | 75.2 | " |
| 12 | " | " | " | 2000 | 67.9 | " |

It is seen from the results of Table 5 that the effects of the present invention are exhibited more prominently in charging and discharging at a high current as compared with at a low current.

EXAMPLE 6

The slurry of the positive electrode material mixture prepared in Example 1 was applied to one side of each of two 15 μm thick aluminum foils to different coating thicknesses. The two coated aluminum foils were laid one on the other with the coated surface outside, and used as a positive electrode. The coating thickness on each side of the positive electrode was varied in the same manner as in Example 1 (as shown in Table 1), with the total coating thickness on both sides being 150 μm. The positive electrode had a width of 41 mm and a length of 265 mm.

A negative sheet electrode which was prepared in the same manner as in Example 1 had a width of 41 mm, a length of 280 μm, and a coating thickness of 80 μm on each side thereof. As a result of performance evaluation, the winding properties of the sheet electrodes and the cycle characteristics of the resulting battery were satisfactory.

As has been fully described, the present invention provides a nonaqueous secondary battery comprising positive and negative sheet electrodes, each composed of a collector coated with an electrode material mixture containing the respective active material, and a nonaqueous electrolyte containing a lithium salt, in which the electrode material mixture is present on both the inner and the outer sides of the collector and the coating thickness of the electrode material mixture on the inner side of the collector of the positive and/or negative electrode(s) is smaller than that of the electrode material mixture on the outer side of the collector. The battery according to the present invention is excellent in cycle characteristics, and the sheet electrodes have excellent winding properties when rolled up into cylinder.

While the invention has been described in detail and with reference to specific examples thereof, it will be apparent to one skilled in the art that various changes and modifications can be made therein without departing from the spirit and scope thereof.

What is claimed is:

1. A nonaqueous secondary battery comprising positive and negative sheet electrodes, each composed of a collector coated with an electrode material mixture containing the respective active material and a nonaqueous electrolyte containing a lithium salt, wherein the electrode material mixture is present on both the inner and the outer sides of the collector and the coating thickness of the electrode material mixture on the inner side of the collector of the positive electrode is smaller than that of the electrode material mixture on the outer side of said collector, and wherein the negative electrode active material of the battery is capable of intercalating and deintecalating lithium and contains a composition mainly comprising at least one of an amorphous chalcogen compound and an amorphous oxide compound containing at least two elements selected from the groups IIIA, IVA and VA of the periodic table.

2. The nonaqueous secondary battery as claimed in claim 1, wherein the coating thickness of the electrode material mixture on the inner side of a collector of the positive electrode is from 60 to 97% of that of the electrode material mixture on the outer side of said collector.

3. The nonaqueous secondary battery as claimed in claim 1, wherein the total coating thickness of the electrode material mixture on both the inner and the outer sides of a positive electrode (exclusive of the collector) and the electrode material mixture on both the inner and the outer sides of a negative electrode (exclusive of the collector) is from 330 to 600 μm.

4. The nonaqueous secondary battery as claimed in claim 1, wherein the negative electrode active material is a compound represented by formula (I):

$$M^1 M^2{}_p M^4{}_q \qquad (I)$$

wherein $M^1$ and $M^2$, which are different from each other, each represents at least one element selected from the group consisting of Si, Ge, Sn, Pb, P, B, Al, As, and Sb; $M^4$ represents at least one element selected from the group consisting of O, S, Se, and Te; p represents a number of from 0.001 to 10; and q represents a number of from 1.00 to 50.

5. The nonaqueous secondary battery as claimed in claim 1, wherein the active material for the positive electrode is a lithium-containing transition metal oxide.

6. The nonaqueous secondary battery as claimed in claim 5, wherein the lithium-containing transition metal oxide is a lithium-containing oxide of metal selected from the group consisting of Ti, V, Cr, Mn, Fe, Co, Ni, Cu, Mo and W.

7. The nonaqueous secondary battery as claimed in claim 5, wherein the lithium-containing transition metal oxide further contains at least one of another alkali metal or a semimetal selected from the group consisting of Al, Ga, In, Ge, Sn, Pb, Sb and Bi, in an amount of 0 to 10 mol % based on the total amount of the transition metal and semimetal.

8. The nonaqueous secondary battery as claimed in claim 5, wherein the lithium-containing transition metal oxide is a lithium-containing oxide of Co.

9. The nonaqueous secondary battery as claimed in claim 5, wherein the lithium-containing transition metal oxide is one selected from the group consisting of $Li_xCoO_2$, $Li_xNiO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_z$, $Li_xMn_cFe_{2-c}O_4$, a mixture of $Li_xMn_2O_4$ and $MnO_2$, a mixture of $Li_{2x}MnO_3$ and $MnO_2$, and a mixture of $Li_xMn_2O_4$, $Li_{2x}MnO_3$, and $MnO_2$ wherein x=0.6 to 1.2; a=0.1 to 0.9; b=0.8 to 0.98; c=1.6 to 1.96; and z=2.01 to 5.

10. The nonaqueous secondary battery as claimed in claim 1, wherein the nonaqueous electrolyte contains $LiBF_4$ and LiPF$_6$ as the lithium salt dissolved in a mixed solvent of ethylene carbonate and diethyl carbonate in a ratio of ethylene carbonate/diethyl carbonate of 0.4/0.6 to 0.6/0.4 by volume.

11. A process for charging a nonaqueous secondary battery, wherein said nonaqueous secondary battery is charged and discharged at a current having 500 mA to 6 A, wherein said nonaqueous secondary battery comprises positive and negative sheet electrodes, each composed of a collector coated with an electrode material mixture containing the respective active material and a nonaqueous electrolyte containing a lithium salt, wherein the electrode material mixture is present on both the inner and the outer sides of the collector and the coating thickness of the electrode material mixture on the inner side of the collector of the positive electrode is smaller than that of the electrode material mixture on the outer side of said collector, and wherein the negative electrode active material of the battery contains a composition capable of intercalating and deintercalating lithium and mainly comprising at least one of an amorphous chalcogen compound and an amorphous oxide compound containing at least two elements selected from the groups IIIA, IVA and VA of the periodic table.

* * * * *